May 11, 1943.  B. F. WISSNER  2,318,654
AUTOMATIC PHONOGRAPH
Filed May 9, 1941  7 Sheets-Sheet 1

INVENTOR.
BENJAMIN F. WISSNER
BY
ATTORNEY

May 11, 1943.   B. F. WISSNER   2,318,654
AUTOMATIC PHONOGRAPH
Filed May 9, 1941   7 Sheets-Sheet 2

INVENTOR.
BENJAMIN F. WISSNER
BY
J. B. Felshin
ATTORNEY

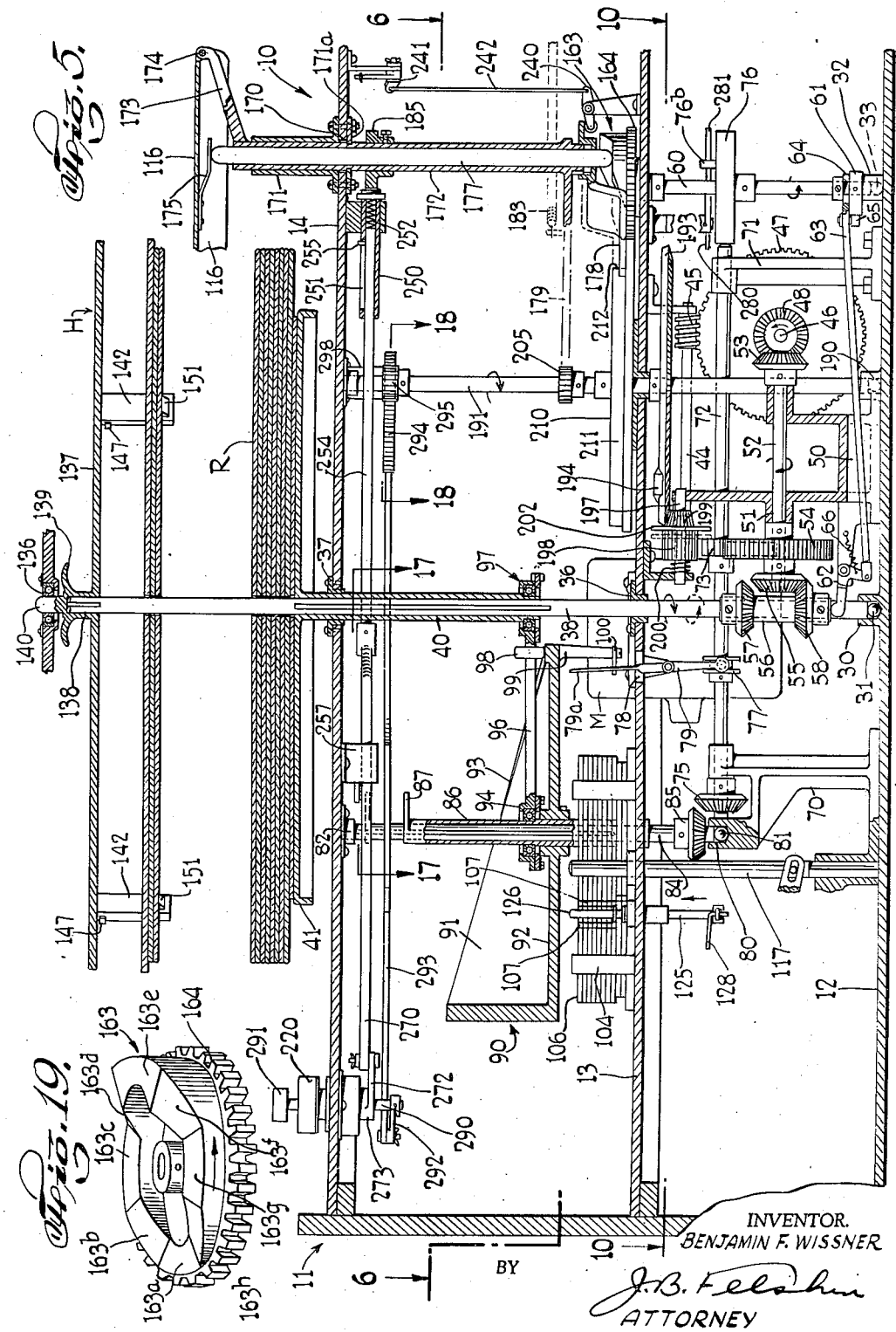

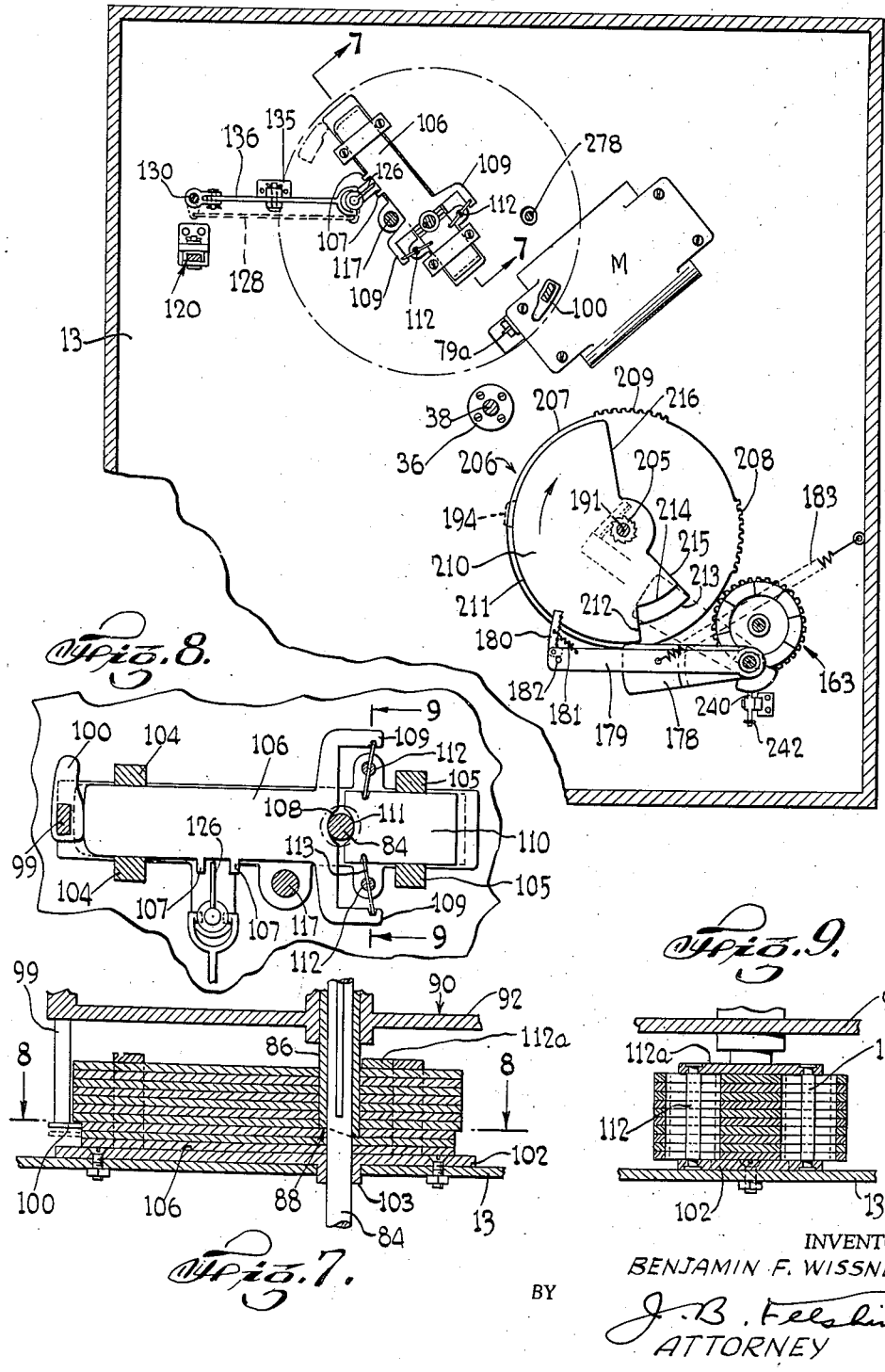

May 11, 1943.   B. F. WISSNER   2,318,654
AUTOMATIC PHONOGRAPH
Filed May 9, 1941   7 Sheets-Sheet 5
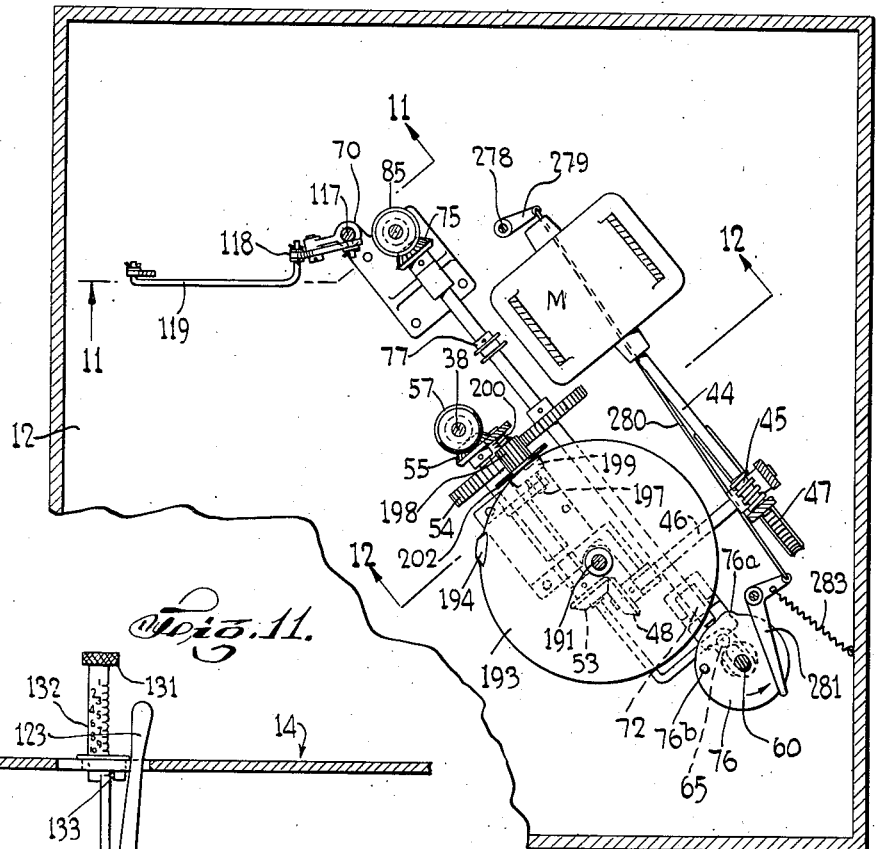
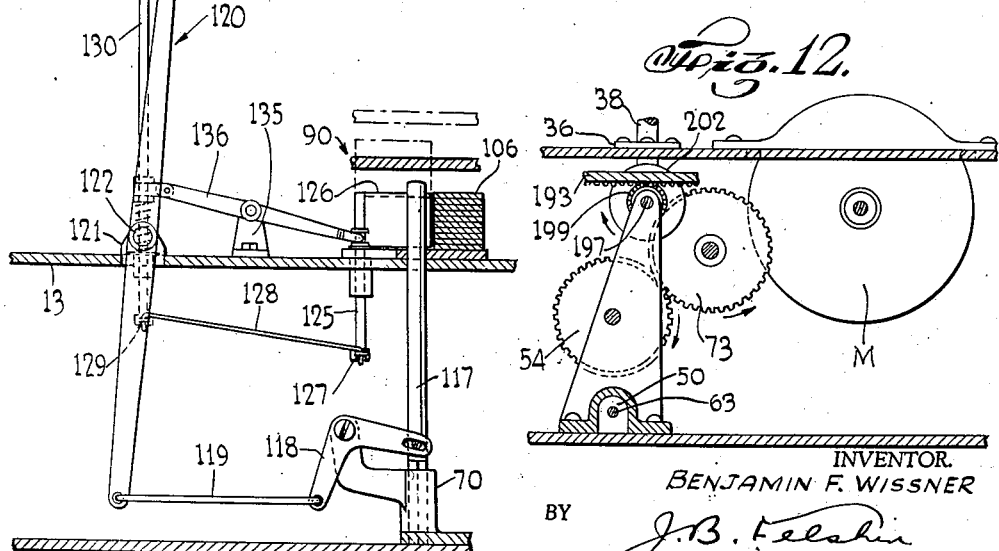
INVENTOR.
BENJAMIN F. WISSNER
BY
J. B. Felshin
ATTORNEY May 11, 1943.  B. F. WISSNER  2,318,654
AUTOMATIC PHONOGRAPH
Filed May 9, 1941  7 Sheets-Sheet 6
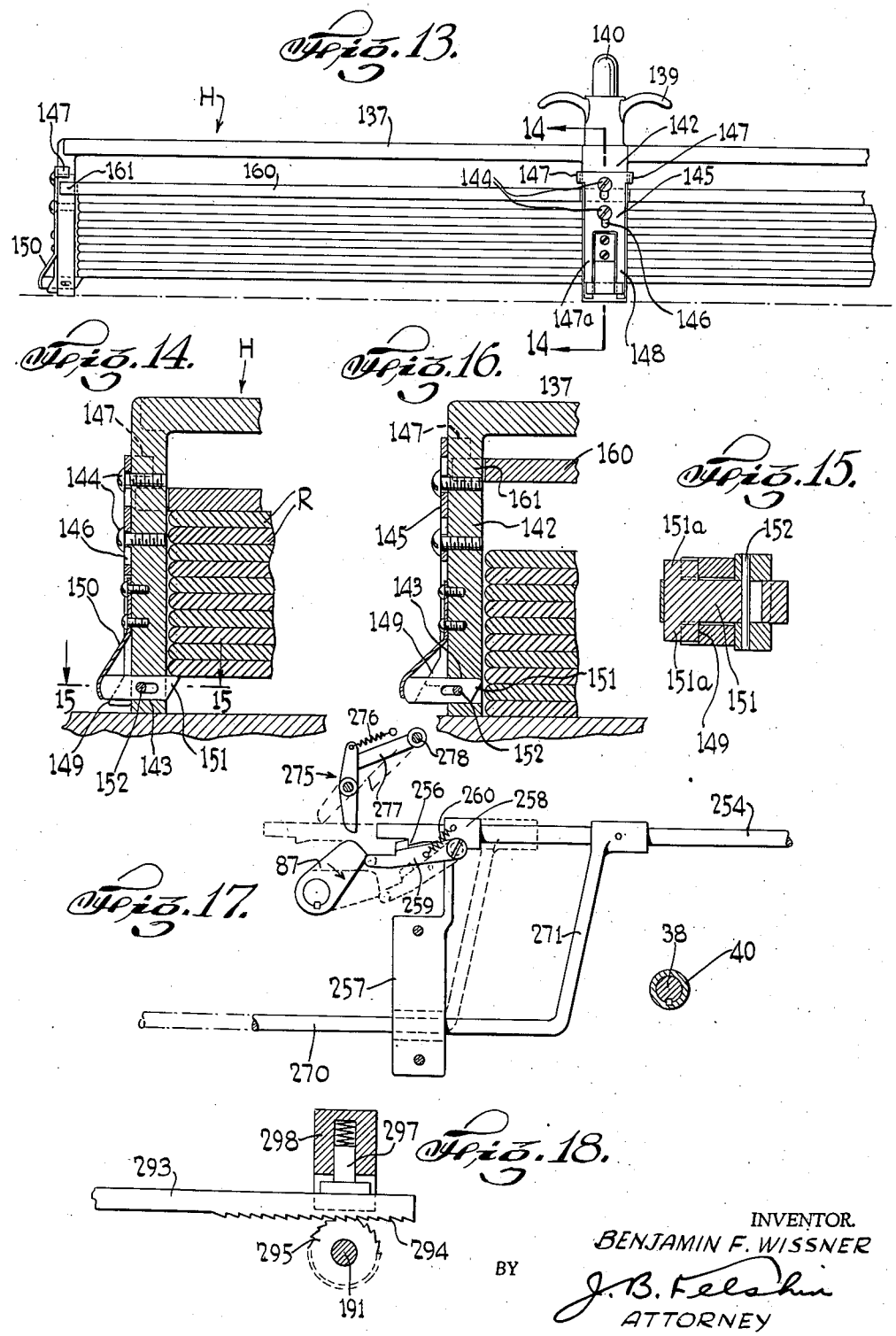
INVENTOR.
BENJAMIN F. WISSNER
BY
J. B. Felshin
ATTORNEY May 11, 1943.　　　B. F. WISSNER　　　2,318,654
AUTOMATIC PHONOGRAPH
Filed May 9, 1941　　　7 Sheets-Sheet 7
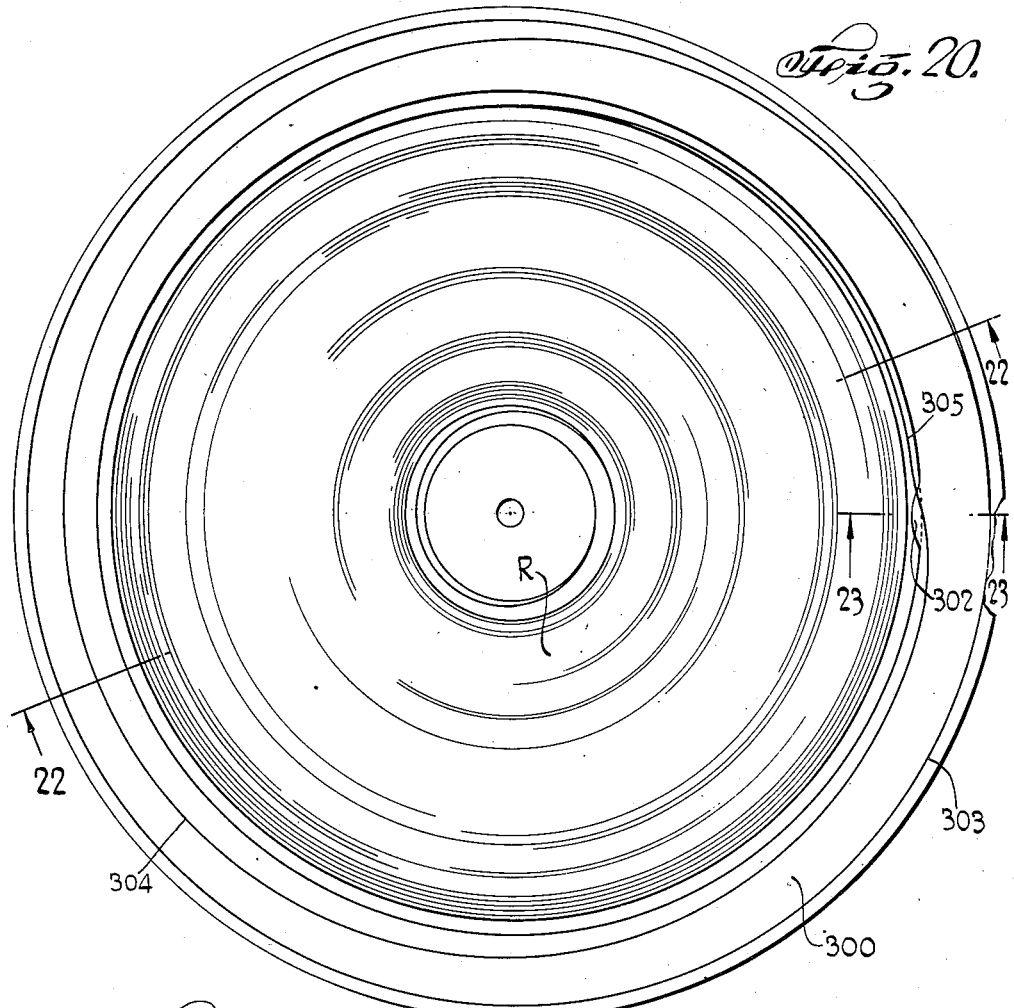
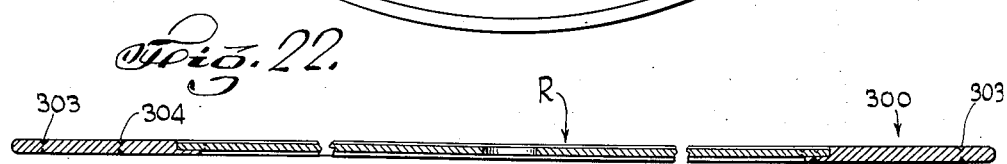
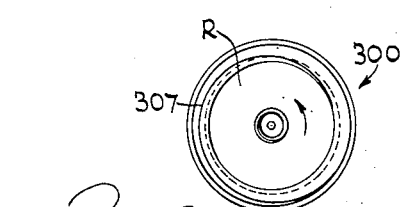
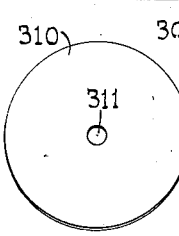
INVENTOR.
BENJAMIN F. WISSNER
ATTORNEY Patented May 11, 1943

2,318,654

UNITED STATES PATENT OFFICE 2,318,654

AUTOMATIC PHONOGRAPH

Benjamin F. Wissner, New York, N. Y.

Application May 9, 1941, Serial No. 392,740

23 Claims. (Cl. 274—10)

This invention relates to automatic phonographs. It is particularly directed to an automatic phonograph having means for successively playing opposite sides of a plurality of stacked phonograph records.

An object of this invention is to provide an automatic phonograph of the character described, having means for automatically successively playing opposite sides of stacked records, all of which are either one or the other of two different diameters, or which are of both diameters.

A further object of this invention is to provide an automatic phonograph of the character described, including means for first playing the upper side of the topmost record in the stack, then lifting the topmost record off the stack and playing the underside of the lifted record; then playing the upper side of the next record; then lifting said next record and playing the underside thereof, and so forth.

Yet a further object of this invention is to provide an automatic phonograph of the character described, comprising a turntable on which the stack of records to be played are mounted, and means to play the upper side of the topmost record of the stack, and thereafter raise the turntable, and take off the topmost record and hold the same while the turntable lowers with the remainder of the records in the stack, and thereafter play the underside of the engaged record, and to thereafter play the upper side of the then topmost record of the stack on the turntable, and repeat the cycle of operation.

Another object of this invention is to provide an automatic phonograph of the character described, in which any number of records up to a predetermined number of records may be successively played, and which will automatically stop after all of the records in the stack are played, and including means to skip playing of any record in the stack.

Yet another object of this invention is to provide in an automatic phonograph of the character described, a highly improved holder to successively take and store the top record in the stack each time the turntable is lifted, the holder being provided with means to release all of the records therein.

Most records come in ten and twelve inch sizes. Where it is desired to successively play a stack of records, including twelve inch and ten inch records, the ten inch records are fitted within a flat ring having an outer diameter similar to the twelve inch records, the ring being provided with a spiral groove to quickly bring the stylus to a point where it will start playing the ten inch record. In accordance with the present invention, if all of the records in the stack are ten inch records, the rings are not necessary, as the machine may be regulated to play the ten inch records directly.

Still another object of the present invention is to provide a compact and durable automatic phonograph of the character described, which shall be relatively inexpensive to manufacture, easy to manipulate, smooth and positive in action, and yet practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention, Fig. 1 is a top plan view of an automatic phonograph embodying the invention;

Fig. 5 is a cross-sectional view taken on line 5—5 of Fig. 1;

Fig. 6 is a cross-sectional view taken on line 6—6 of Fig. 5;

Fig. 7 is a cross-sectional view taken on line 7—7 of Fig. 6;

Fig. 8 is a cross-sectional view taken on line 8—8 of Fig. 7;

Fig. 9 is a cross-sectional view taken on line 9—9 of Fig. 8;

Fig. 10 is a cross-sectional view taken on line 10—10 of Fig. 5;

Fig. 11 is a cross-sectional view taken on line 11—11 of Fig. 10;

Fig. 12 is a cross-sectional view taken on line 12—12 of Fig. 10;

Fig. 13 is a side elevational view of the device for taking off the top records from the stack;

Fig. 14 is a cross-sectional view taken on line 14—14 of Fig. 13;

Fig. 15 is a cross-sectional view taken on line 15—15 of Fig. 14;

Fig. 16 is a view similar to Fig. 14, but showing the means for releasing the records from the holder;

Fig. 17 is a cross-sectional view taken on line 17—17 of Fig. 5;

Fig. 18 is a cross-sectional view taken on line 18—18 of Fig. 5;

Fig. 19 is a perspective view of the cam for regulating the height of the stylus;

Fig. 20 is a top plan view of a ten inch record within a ring, to be used when playing mixed ten and twelve inch records;

Fig. 21 is a plan view of the underside of a record and ring receiving the same;

Fig. 22 is a cross-sectional view taken on line 22—22 of Fig. 20;

Fig. 23 is a cross-sectional view taken on line 23—23 of Fig. 20; and

Fig. 24 is a perspective view of a shim used between the ten inch records when playing only ten inch records.

Figure 1:
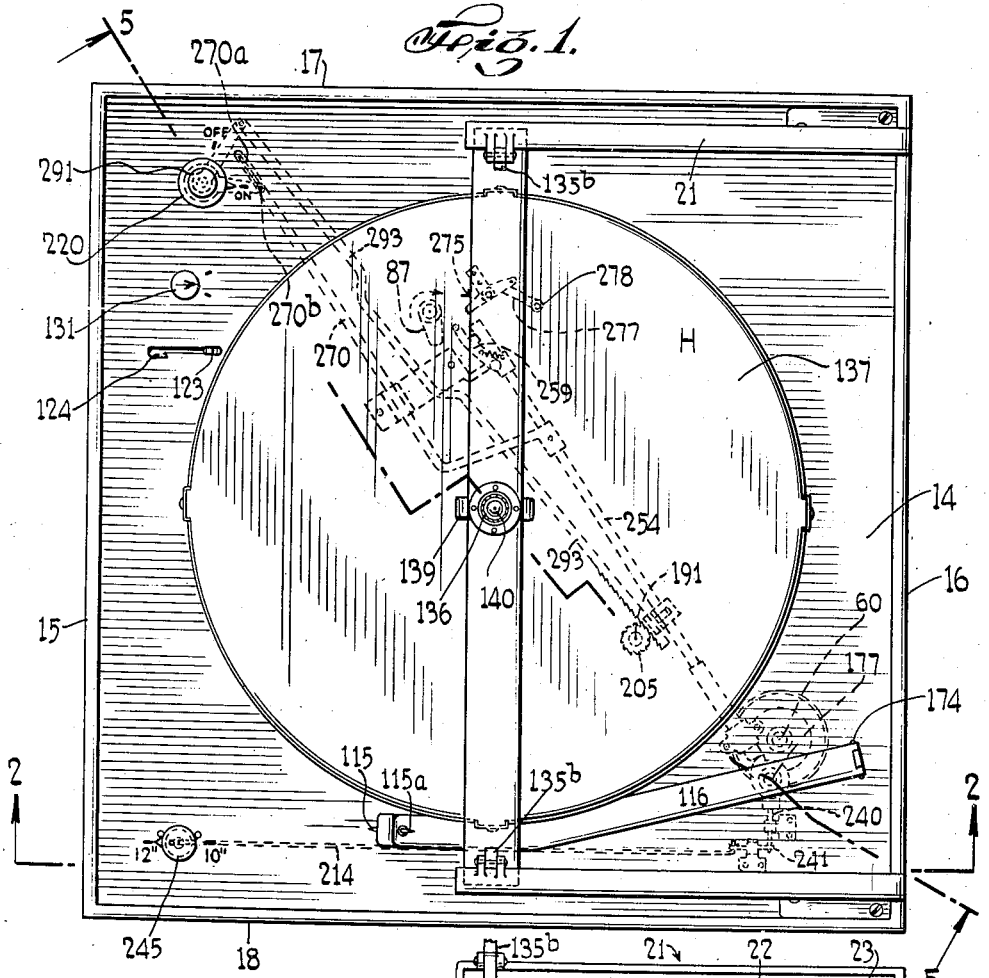
Figure 2:
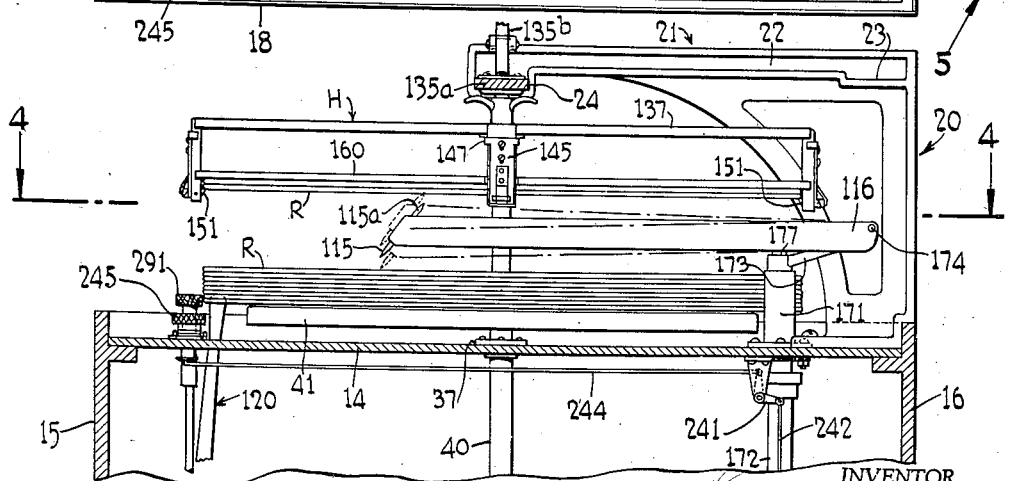
Fig. 2 is a partial, cross-sectional view taken on line 2—2 of Fig. 1.
Figure 4:
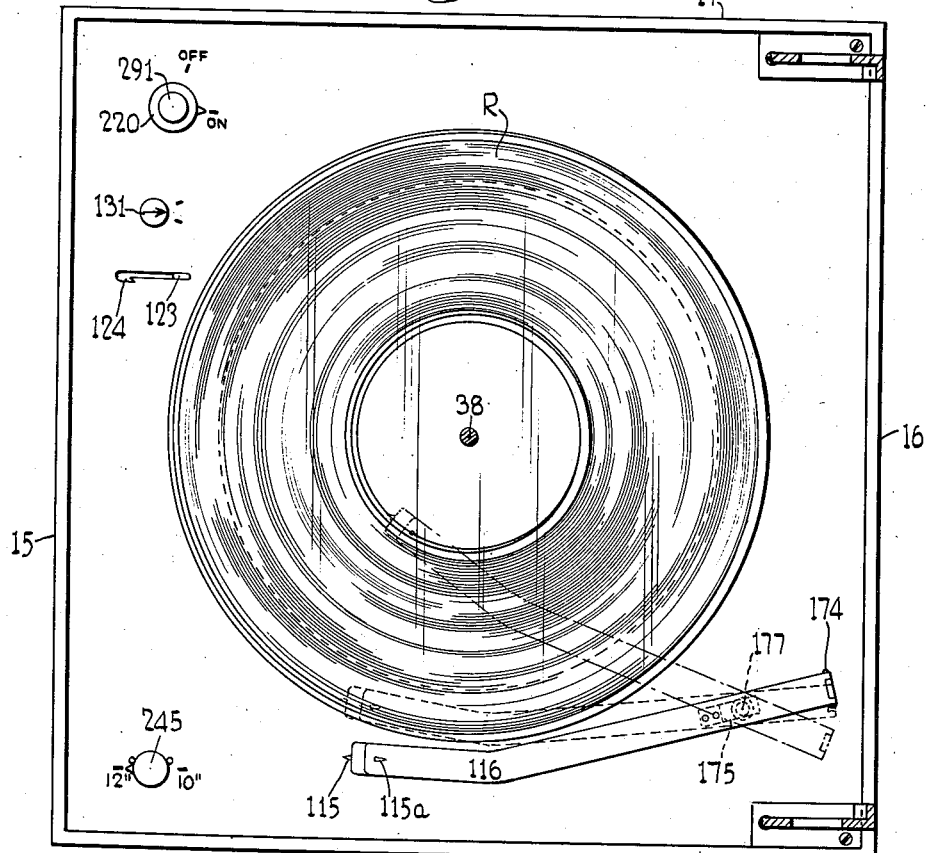
Fig. 4 is a cross-sectional view taken on line 4—4 of Fig. 2.
Figure 3:
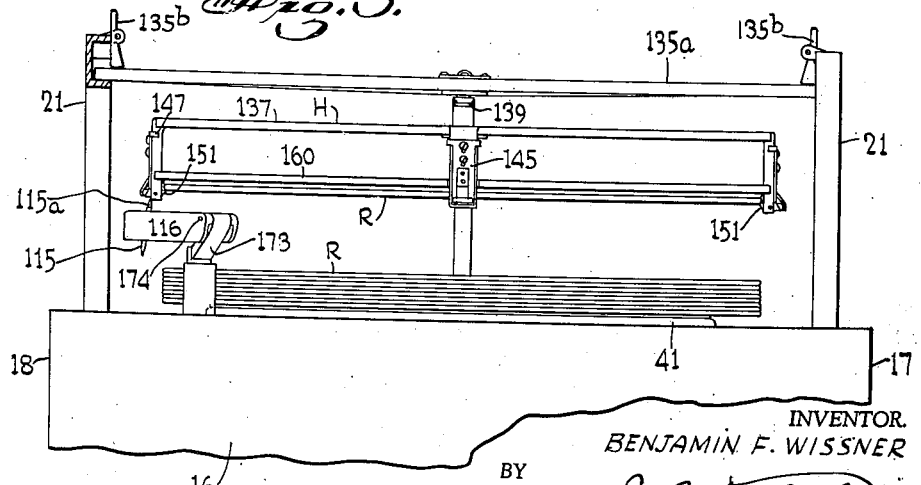
Fig. 3 is a back view of the upper portion of the machine embodying the invention.

Referring now in detail to the drawings, 10 designates an automatic phonograph embodying the invention. The same comprises a housing, base or frame 11 having a bottom horizontal wall 12, and an intermediate horizontal wall 13, and a top horizontal wall 14, a front wall 15, a rear wall 16, and side walls 17 and 18. Attached to the top wall 14, adjacent the side walls 17 and 18, and at the rear wall 16, are a pair of upstanding, parallel brackets 20 having horizontal forwardly extending arms 21 at the upper ends thereof. Said arms 21 are formed with longitudinal slots 22, enlarged downwardly at the ends thereof, as at 23 and 24, for the purpose hereinafter appearing.

The bottom wall 12 is formed with an upwardly extending, central socket 30, within which is a ball thrust bearing 31. Said bottom wall 12 is furthermore formed with an upstanding socket 32, within which is a ball thrust bearing 33. Socket 32 is offset from the socket 30.

The intermediate horizontal wall 13 is formed with a central opening receiving a bearing bushing 36, aligned with socket 30. The top wall 14 is also formed with a central opening receiving a bearing bushing 37, aligned with bushing 36 and socket 30. Extending through bushing 36 is a vertical shaft 38 resting at its lower end on the thrust bearing 31. Shaft 38 extends through bushing 37 up to substantially the height of the slotted arms 21.

Slidably mounted on vertical shaft 38, and keyed thereto, is a sleeve 40 carrying a turntable 41 at its upper end, disposed above the top wall 14. The turntable 41 is adapted to carry a stack of records R to be played.

Means is provided for rotating the turntable 41 in opposite directions. To this end, there is mounted on wall 13 an electric motor M having a horizontal output shaft 44 disposed below wall 14. On shaft 44 is a worm 45. Suitably supported on bottom wall 12 is a rotary shaft 46 carrying a worm wheel 47, meshing with worm 45. On shaft 46 is also a beveled gear 48, for the purpose hereinafter appearing.

Mounted on bottom wall 12 is a bracket 50 having horizontally aligned bearing 51, journalling a shaft 52. Shaft 52 carries a beveled gear 53 at one end meshing with beveled gear 48. On shaft 52 is a gear 54 and also a beveled gear 55. Slidably mounted on vertical shaft 38, and keyed thereto, is a reversing clutch member 56 carrying oppositely disposed beveled gears 57 and 58 at the ends thereof. When beveled gear 58 meshes with beveled gear 55, vertical shaft 38 is rotated in one direction; (shown by full line arrow); and when clutch member 56 moves downwardly so that beveled gear 57 meshes with beveled gear 55, said shaft 38 is rotated in an opposite direction (as shown by dotted arrow).

Means is provided for reciprocating the clutch 56. To this end, wall 13 is provided with a bearing opening aligned with socket 32, in which is journalled a vertical shaft 60, the lower end of which contacts the thrust bearing 33. Carried by shaft 60 is a cam 61. Pivoted to the bracket 50 is a bell crank 62 having one arm contacting the underside of the clutch 56. Connected to the other end of bell crank 62 is a connecting rod 63 having a slot portion 64 receiving the shaft 60. On the connecting rod 63 is a roller 65 contacting cam 61. Bell crank 62 is interconnected to the bracket 50 by a coil tension spring 66.

It will now be understood that as shaft 60 is rotated, in a manner to be hereinafter described, the cam 61 through its contact with roller 65, will rotate the bell crank 62 to lift the clutch 56, during part of the rotation of shaft 60, and will permit the spring 66 to rotate the bell crank in a direction to permit the clutch 56 to lower, during another part of rotation of the shaft 60. The vertical shaft 38 is thus rotated in opposite directions during each revolution of shaft 60.

Means is provided to reciprocate the turntable 41 so that after it makes a sufficient number of revolutions in its lower position, it will be lifted sufficiently for the topmost record R to be taken off the stack, in the manner hereinafter described, and then immediately lowered to a position where the level of the then topmost record is similar to the level of the previous topmost record. To this end, there is mounted on bottom wall 12, a pair of brackets 70 and 71 having bearing openings rotatably and slidably supporting a shaft 72 provided with a pinion 73 meshing with gear 54. At one end of shaft 72 is a beveled gear 75. On vertical shaft 60 is another cam 76 adapted to move shaft 72 to the left at one point in the rotation of the cam, for the purpose hereinafter appearing.

On shaft 72 is a shifting clutch 77 to shift the shaft 72 to the right, for the purpose hereinafter appearing. The wall 13 is formed with an opening 78, and fixed to the underside of the wall is a bracket on which is pivoted a lever 79, the lower end of which engages the shifting clutch 77. Said lever is provided with a spring arm 79a extending upwardly above wall 13, for the purpose hereinafter appearing.

Bracket 70 is formed with a socket 80 in which is mounted a thrust ball bearing 81. On the underside of wall 14 is a bearing 82, aligned with the thrust bearing 81. Journalled on and between the bearings 80 and 82, is a vertical shaft 84, to the lower end of which is fixed a beveled gear 85 adapted to be engaged by the beveled gear 75 when shaft 72 is moved to the left. Keyed to shaft 84 is a sleeve 86 provided with an offset finger 87 at its upper end. The lower end of the sleeve 86 is beveled, as at 88.

Fixed to sleeve 86 is a cam 90 having an annular cylindrical wall 91 and a bottom wall 92. Cylindrical wall 91 has an upper edge 93. The upper edge 93 is shaped helically upwardly through 180 degrees, and symmetrically helically downwardly through the other 180 degrees.

Rotatably and slidably mounted on sleeve 86 and resting on the bottom wall 92, is one end 94 of a radial arm 96, the other end 97 of said arm rotatably receives the lower end of sleeve 40, said sleeve 40 resting on said end portion 97 of the arm 96. On arm 96 is a roller 98 contacting the edge 93 of cam 90.

It will now be understood that as the shaft 84 rotates, the arm 96 will rise and then fall to lift and lower the turntable.

Extending downwardly from wall 92, and aligned with the lowermost portion of cam edge 93, is an arm 99 provided with a finger 100 adapted to engage the upper end of lever 79, to rotate the same in a direction for moving shaft 72 to the right, and disengaging beveled gear 75 from beveled gear 85. The cam 90 thus makes one revolution during which revolution the turntable is lifted and lowered.

Means is provided to lift the cam bodily a height equivalent to the thickness of one record each time it makes one revolution, so that when the turntable is lifted and then lowered, the upper surface of the topmost record will be at a predetermined level, so that the upper surfaces of the succeeding records may be played by a stylus at the same level. To this end, there is fixed to the upper surface of wall 13, a plate 102 formed with a bearing portion 103 extending through the opening in wall 13, said shaft 84 passing through said bearing, as shown in Fig. 7 of the drawings.

On plate 102 are two pairs of vertical aligned guides 104 and 105. Slidably mounted between the guides 104 are ten superimposed, stacked, similar shims 106, each formed with a pair of spaced projections 107 on one side thereof. Each shim 106 is furthermore formed at one end with a curved notch 108 adapted to partially receive the shaft 84, and with a pair of outwardly and forwardly extending arms 109. Slidably mounted between the guides 105 are ten superimposed shims 110 of similar thickness to the shims 106, and likewise formed with notches 111 symmetrical to the notches 108, and adapted to partially receive the shaft 84. The thickness of the shims 106 and 110 is similar to the thickness of the twelve inch records R.

Rotatably mounted on plate 102, and disposed between the arms 109 and the shims 110, are a pair of vertical rods 112 interconnected at their upper ends by a plate 112a, in which said upper ends are journalled. Mounted on said rods 112 are springs 113 interconnecting each pair of arms 109 with the shim 110 associated therewith. Thus, each shim 106 is connected to its associated shim 110 by a pair of springs 113. When the shims 106 are moved inwardly toward shaft 84, the springs 113 will tend to move the shims 110 associated therewith inwardly against sleeve 86 and shaft 84. When the shims 106 are moved outwardly away from shaft 84, the springs 113 will also move the related shims 110 out of contact with respect to said shaft.

It will be noted that each time, the cam 90 makes one revolution, the finger 100 will move one of the shims inwardly, when the turntable is in lifted position. If ten records are to be played, all the shims are first moved outwardly, in a manner hereinafter to be explained, so that the lowermost point of the underedge 88 of sleeve 86 contacts plate 102 and is disposed on the side of shaft 84 adjacent the shims 106. As the cam 90 rotates through 180 degrees to lift the turntable, said lowermost point of the underedge 88 moves to the side of shaft 84 adjacent the shims 110, and at the same time, the finger 100 moves the lowermost shim 106 inwardly beneath the edge 88.

As cam 90, together with sleeve 86 continue to rotate for another 180 degrees, the sleeve rides up on the shims 106 which is moved against the shaft 84, and said sleeve is lifted a height equal to the thickness of one of the shims, so that when the turntable comes down again, it will be at a level higher than its previous lower level by the thickness of one record. When the sleeve 86 is lifted the height of one shim, the shim 110 corresponding to the shim 106, which has moved inwardly, snaps into position shown in Fig. 8 by reason of the springs 113. Thus, during each revolution of cam 90, the cam is lifted the height of one shim or the height of one record.

The reason for lifting the cam 90 during each revolution is because the upper surfaces of the records R are played by a needle 115 on arm 116 which always moves to the same position for playing the upper surface of the topmost record on the turntable, as will be explained in greater detail hereinafter. Also because the turntable is raised always a predetermined height by cam 90, and this height must always start at the same level.

Means is provided for moving all of the shims 106 outwardly or inwardly; or any number of shims from the top down outwardly, whereby any number of records up to a maximum number may be played. (Ten records as illustrated in the drawings.) To this end, there is slidably and non-rotatably mounted on bracket 70, a vertical shaft 117 extending through a suitable opening in wall 13. Pivoted to said bracket 70 is a bell crank 118 connected by the link 119 to the lower end of a lever 120. Lever 120 extends through an opening in wall 13 and is pivoted to bracket 121 about a horizontal axis, as at 122. The upper end of lever 120 passes through a slot 123 in wall 14. Upon swinging the lever 120 in a counterclockwise direction, looking at Fig. 11, rod 117 will lift to hold the cam 90 in its topmost position.

The slot 123 has a notch 124 at one end so that the lever may be locked in a position where the cam 90 is supported in raised position. Rotatably and slidably mounted in an opening in wall 13, adjacent slot 123, is a vertical shaft 125, to the upper end of which is attached a flag like plate 126 disposed between the lugs 107. Attached to the lower end of shaft 125 is a radial arm 127 connected by a link 128 to an arm 129 on the lower end of a vertical shaft 130, passing through aligned bearing openings in the walls 13 and 14, and rotatably and slidably mounted in said bearing openings.

At the upper end of shaft 130 is a knob 131, and below the knob is a thickened portion 132 formed with ten notches numbered "1" to "10," equally spaced apart by distances equal to the thickness of the shims and records. There are as many notches as records the machine is designed to play. On wall 14 is a spring pressed ball 133 adapted to snap into the various notches as the shaft 130 is raised or lowered.

It will now be understood that rotation of shaft 130 by means of knob 131 will cause rotation of the flag 126 to throw the shims 106 either out or in.

Means is provided to lift the flag 126 to any desired height, so that any desired number of shims from the top down may be thrown out while the remainder of the shims are in. To this end, there is mounted on wall 13 a bracket 135, to which there is pivoted a lever 136 having a rotatable, but non-slidable connection at the opposite ends thereof with shafts 125 and 130.

Thus, movement of the shaft 130 up or down will cause movement of the flag 126 in an opposite direction.

The notches or portions 132 are numbered from "1" to "10" beginning at the top and going down. If it is desired to play all ten records, the knob 131 is lifted fully until the flag 126 is all the way down. The knob is then rotated to throw all the shims out. If it is desired to play only nine records, knob 131 is first raised fully and rotated in an opposite direction until all the shims are thrown in. Thereafter, the knob is pushed down until the ball 133 snaps into notch number "9," and the flag 126 is then swung to throw out all but the lowermost shim. While the shims are being adjusted to desired position, the lever 120 is pulled back to raise the cam 90 and locked in notch 124. Thus, any number of records may be played by regulating the shims as described above. If five records are to be played, only the topmost five shims are thrown out, and the remainder of the shims are not. If four records are to be played, only the topmost four shims are thrown out and all the shims therebelow are thrown in, and so forth.

Means is provided to take off the topmost record as the turntable is lifted, and to store the records which are taken off. To this end, there is slidably mounted on the arms 21, a transverse horizontal member 135a, the ends whereof are received in slots 22. Pivoted to arms 21 adjacent the forward ends of slots 22, are levers 135b to press down on the ends of member 135a when said member is within portions 24 of said slots. Said levers have weighted arms which drop when member 135a drops into slot portions 24, and arms to swing said levers up to permit movement of member 135a rearwardly.

When member 135a is moved forwardly, the ends thereof may drop into the enlarged portions 24 of slots 22. Said member 135a furthermore may be lifted and pushed rearwardly so that the ends thereof will drop into the enlarged portions 23 of slots 22. Said member 135a is formed with a central ball bearing 136, for the purpose hereinafter appearing.

Mounted on and keyed to the upper end of shaft 38 is a holder H comprising a circular plate 137 formed with a central upstanding socket 138 to receive the upper end of shaft 38. Extending outwardly from the socket 138 are a pair of finger engaging handles 139 and a central upwardly extending short post 140. The post 140 is adapted to rotatably fit into the bearing 136.

Extending downwardly from the periphery of plate 137 are four or more equiangularly spaced, vertical arms 142, each formed with a horizontal slot 143 adjacent its lower end. Attached to each arm 142 are a pair of vertically aligned, horizontal headed screws 144 on which is slidably mounted a vertical plate 145 having slots 146 to receive the shanks of said screws. Each plate 145 is formed with a pair of inwardly extending wings 147 engaging the opposite edges of arm 142. Each sliding plate 145 has a vertical slot 147a forming bifurcated arms 148, the lower ends of said arms having downwardly and outwardly beveled portions 149. Attached to each arm 142 is a spring 150 disposed within the slot 147a and between the arms 148. Spring 150 has a downwardly and outwardly inclined portion curved inwardly at its lower end.

Within each slot 143 is slidably mounted a horizontal catch 151, longitudinally slotted to receive a transverse fixed pin 152. The lower end of spring 150 engages the outer end of catch 151 normally urging the catch inwardly. The catch 151 is T-shaped horizontally, being formed with side extensions 151a at its outer end adapted to overlap the beveled portions 149 of plate 145.

Within the holder is a circular weighted plate 160 having notches 161 to receive the arms 142. When the plate 160 is raised it will engage the wings 147 and slidably move the plates 145 upwardly to cause the beveled portions 149 thereof to push back the catches to release the records within the holder, as shown in Fig. 16 of the drawings. Thus, when the holder is full of records, the transverse member 135a may be lifted to disengage the post 140 and move rearwardly out of the way. The entire holder may then be grasped by the finger engaging portions 139, lifted off the phonograph and placed on a table. Plate 160 may then be raised to cause the catches 151 to be retracted to release all the records. The entire holder may then be lifted off, leaving the records on the table.

It will be understood that the machine may be provided with two holders, one to play ten inch records, and one to play twelve inch records, the phonograph being provided with means, hereinafter to be described, for playing either ten inch records or twelve inch records.

It will now be understood that the turntable is always raised a predetermined vertical distance, that distance being exactly sufficient to bring the topmost record on the turntable just past the catches 151, which serve to hold the record within the holder as the turntable again descends. Thus, each time the turntable is lifted, another record is taken off the top of the stack and held in the holder. If less than ten records are played, the shims must be adjusted, as heretofore described, to bring the topmost record to be played to a predetermined height. The adjustment of the shims by manipulating the knob 131 is made before the switch for the motor M is turned "on," in a manner hereinafter to be described.

The arm 116 in addition to carrying a downwardly pointing needle 115, also carries an upwardly pointed needle 115a adapted to play the undersides of the records which have been engaged within the holder H.

Means is provided to play the upper surface of the topmost record R of the stack on the turntable; then to move the arm 116 carrying the styli to neutral position off the record; then to swing the arm out of the way of the records to permit the turntable to be lifted, and then lowered; then to play the underside of the record which has been engaged within the holder; then to move the arm again to neutral position and then outwardly away, beyond the peripheries of the records; and then to again play the top side of the then topmost record on the stack, and so forth.

To this end, the shaft 60 projects upwardly through intermediate horizontal wall 13, and mounted on the upper end of said shaft is a cam 163 provided with an annular gear 164. Cam 163 is divided into eight sections of equal angular extent, there being a low section 163a, a rising section 163b, extending from section 163a, a neutral section 163c, extending from section 163b and disposed at a higher level than section 163a. Extending from neutral section 163c is a rising section 163d, and extending therefrom is a horizontal section 163e disposed opposite to the lower section 163a and at a higher level than the neutral section 163c. Extending from section 163e is an inclined section 163f, from which there extends another neutral section 163g, at the same height as section 163c. Extending from section 163g is an inclined section 163h, which terminates with the beginning of section 163a.

Wall 14 is formed with an opening 17, and mounted on said wall is a bushing 171, within which there is journalled a sleeve 172, non-slidably mounted within said bushing in any suitable manner. Sleeve 172 may be prevented from sliding by a flanged collar 172a fixed to wall 14. At the upper end of the sleeve 172 is an offset arm 173, to which the arm 116 carrying the styli, is pivoted, as at 174. Attached to the underside of arm 116 is one end of a spring 175, the free end of said spring overlying said sleeve. The sleeve 172 is directly above the path of the cam sections of cam 163. Slidably mounted within said sleeve is a rod 177, the lower end of which is adapted to contact said cam sections, and the upper end of which is adapted to contact spring 175. Slidably and non-rotatably engaging the lower end of sleeve 172 is an arm 178, for the purpose hereinafter appearing.

Fixed to said sleeve 172 is another arm 179, to the outer end of which there is pivoted a ratchet arm 180. A spring 181 urges the ratchet arm 180 to rotate in a clockwise direction, looking at Fig. 6 of the drawings. A stop 182 on arm 172 further limits rotation of said arm 180 in one direction. A spring 183 tends to rotate arm 179, and hence sleeve 172, likewise in a clockwise direction, looking at Fig. 6 of the drawings. Spring 183 interconnects the arm 179 with a wall of the housing. Fixed to the sleeve is also a cam 185, disposed below wall 14, and having a function to be described hereinafter.

Mounted on bracket 50 is a thrust bearing 190, and mounted thereon, is a vertical shaft 191 passing through a suitable bearing in wall 13, the upper end of said shaft being received in a bearing fixed to the underside of wall 14. Fixed to shaft 191 and disposed below wall 13, is a beveled gear 193. Gear 193 is also formed with a radial projecting lug 194, for the purpose hereinafter appearing.

Journalled on suitable brackets within the housing, is a horizontal shaft 197 carrying a pinion 198 and a beveled gear 199. The beveled gear and pinion are fixed to one another, and both are freely mounted on shaft 197. On said shaft is a coil compression spring 200 urging the beveled gear 199 to the right into engagement with the beveled gear 193. Between the beveled gear 199 and the pinion 198, is an annular collar 202 adapted to be engaged by the lug 194 once during each revolution of the beveled gear 193, to disengage the beveled gear 199 from the beveled gear 193. Pinion 198 meshes with pinion 73, and therefore rotates continuously while the motor is in operation.

The beveled gear 193 rotates continuously except when the lug 194 pushes against the collar 202 to push back the beveled gear 199. When the lug 194 pushes against the collar, beveled gear 193 stops rotating and the lug continues in engagement with the collar until the beveled gear 193 is rotated further in a manner hereinafter to be explained, so that the lug 194 will pass the collar and permit the spring 200 to again engage the beveled gear 199 with the beveled gear 193 to rotate the latter.

On shaft 191 is a ratchet 205 adapted to be engaged by the ratchet 180, when the arm 179 swings inwardly in a clockwise direction looking at Fig. 6 of the drawings, to move the lug 194 beyond the collar 202 and again start rotation of the beveled gear 193.

Fixed to shaft 191 and disposed above the wall 13, is a member 206 having a circular bottom portion 207 provided with two segmental sets of spaced gear teeth 208 and 209. Said gear portions are adapted to mesh with the pinion 164 of cam member 163, and each of said gear portions are adapted to rotate the cam 163 through an angle of 90 degrees.

On circular portion 207 is a cam portion 210 having a circular peripheral portion 211 extending through an angle of 180 degrees. Extending from one end of the circular portion 211 is a radial wall 212, from which there extends a circular wall 213 of a diameter less than the circular portion 211 and disposed at the level of the arm 178, when said arm is in its lower position. The circular portion 213 is of a height only half the height of the circular portion 211. Above the circular portion 213 is another circular portion 214, having the same angular extent as circular portion 213, but of smaller diameter. Extending from the other ends of the circular portions 213 and 214 is a radial surface 215. Extending from the opposite end of circular portion 211 is also a radial surface 216. The arm 178 is adapted to contact circular portion 211 as member 206 rotates in the direction of the arrow shown in Fig. 6 of the drawings. When the circular portion 211 passes the arm 178, said arm will be rotated by spring 183 in a clockwise direction looking at Fig. 6 of the drawings, until it contacts circular portion 213. As the member 206 continues to rotate to bring circular portion 213 past arm 178, said arm may further move in a clockwise direction, looking at Fig. 6 of the drawings.

As member 206 continues to rotate, arm 178 will be engaged by radial surface 216 and move in a counterclockwise direction, until the arm contacts again the circular portion 211, during which period the arm 178 is not rotated. The arm 178 being non-rotatably connected to sleeve 172, controls the angular position of arm 116 which carries the needles. As will be shown hereinafter, cam 163 controls the height of arm 116.

It will now be understood that it requires two complete revolutions of member 206 to revolve the cam member 163 one revolution. During one revolution of the cam 163, the machine goes through a complete cycle which includes playing the top of one record, lifting the record to the holder, lowering the turntable, and then playing the underside of the same record while it is supported by the holder, and then bringing the arm 116 back to its initial position. In other words, one complete revolution of cam 163 corresponds to the complete playing of one record.

The operation of the structure thus far described, will now be explained.

The holder is first removed and emptied of its records. A stack of records is then placed on the turntable and the holder replaced. The lever 120 is then pulled back to raise cam 90, and knob 131 rotated to throw all the shims out, if ten records are to be played. If less than ten records are on the stack, all the shims are thrown inwardly first, and then the knob 131 pulled up until the proper number shows on portion 132, indicating the number of records on the stack. The knob 131 is then rotated in a direction to throw out as many shims as there are records to be played counting from the top down. Lever 120 is then released to lower rod 177. A knob 220 rotatably mounted on wall 14 may then be rotated to close any suitable motor switch (not shown) to start the operation of motor M. The motor rotates shaft 44, and through the worms and bevel gears, rotates shaft 52.

The machine is initially as shown in the drawings, with the clutch 56 up to rotate the shaft 38 in the direction shown by the full line arrow. The rod 177 rests on neutral section 163g of cam 163. Arm 178 contacts circular portion 211 of cam 210, and arm 116 is therefore swung outwardly, out of the way of the records. Beveled gear 199 is in engagement with the beveled gear 193. Shaft 72 is at the right, and therefore, beveled gear 75 does not engage beveled gear 85.

As the motor continues to operate, member 206 rotates to a position where arm 178 moves inwardly against the cam portion 213, and at the same time, rod 177 moves down cam portion 163h, being rotated by engagement of segmental gear portion 208 with the gear 164. During this operation, the needle 115 moves into the outermost portion of the groove on the upper side of the topmost record on the turntable. When cam portion 213 passes arm 178, the arm may rotate inwardly and the playing of the record starts because arm 116 has been lowered to bring the needle 115 into the groove. While the record is playing, the rod 177 is on the lower portion 163g of cam 163.

At this time, furthermore, lug or projection 194 contacts collar 202 to stop rotation of member 206 until the record is fully played. Engagement of the needle in the record groove swings arm 178 inwardly so that ratchet 180 rotates ratchet 205, and hence rotates shaft 191 and beveled gear 193 sufficiently to bring the lug 194 off the collar 202 to again start rotation of the beveled gear and member 206.

After the record is played, segmental gear portion 209 of member 206 again rotates cam 163 to raise the rod 177 up cam 163, and onto the neutral cam portion 163c, lifting the needle 115 off the record. At the same time, arm 178 is contacted by radial portion 216 and swung again outwardly to swing arm 116 out of the way of the records. At this time, the bump 76a on cam 76 contacts shaft 72 and shifts the latter to bring beveled gear 75 to mesh with beveled gear 85, causing rotation of shaft 84 and cam 90, to lift the turntable until the record whose top surface has been played is engaged by catches 151 of the holder. The spring arm 79a may flex to permit shifting of shaft 72. The turntable then moves downwardly to a position higher than its former position by the thickness of one record, as explained heretofore.

During this period, the arm 178 is held in its outwardly swung position by contact with circular edge 211 of cam 210. When said circular portion 211 passes arm 178, said arm again swings inwardly, and segmental gear portion 208 rotates cam 163 to cause the rod 177 to ride up cam portion 163d onto high cam portion 163e to bring the needle 115a into the groove on the underside of the record supported by the holder. To play the underside of the record in the holder, shaft 38 must rotate in an opposite direction. This result is accomplished by cam 61 which rotates with shaft 60 permitting the spring 66 to swing the bell crank 62 to permit the clutch 56 to lower to engage beveled gear 57 with beveled gear 55. Now the underside of the record in the holder is played, while cam portion 213 moves past arm 178 and lug 194 again contacts the collar 202 to stop rotation of member 206.

When the record is fully played, shaft 191 is rotated by ratchet 180 to again start rotation of member 206. At the same time, cam 163 is again rotated to bring the rod 177 down again to the neutral cam portion 163g lowering the needle 115a out of engagement with the record. Radial cam portion 216 then again swings arm 178 outwardly and cam 61 rotates bell crank 62 to reverse the direction of rotation of shaft 38, and the operation is repeated for the next record.

Means is provided to permit playing of ten inch records. To play only ten inch records, a holder similar to the one described, but of a size to receive ten inch records is substituted for the holder H which carries the twelve inch records. A stack of ten inch records is placed on the turntable in the same manner as described heretofore, except that due to the difference of thickness in twelve inch to ten inch records, flat round shim washers 310 whose diameter is no larger than the central ungrooved part of the record, are slipped over the shaft 38 beneath each ten inch record. To play only ten inch records, arm 178 must be raised so that said arm will cooperate with the cam portion 214 instead of the cam 213. To this end, there is mounted on wall 13, a bracket carrying a lever 240. Fixed to the underside of wall 14 is another bracket carrying a bell crank 241 interconnected to the lever 240 by a link 242. Bell crank 241 is connected by a connecting rod 244 to a knob 245 on wall 14. Any suitable spring pressed ball may hold the knob in ten inch position. To raise arm 178, it is merely necessary to rotate the knob 245 for rotating bell crank 241 and hence lever 240. Arm 178 will now move further inwardly to bring the needles 115 and 115a into the grooves of the ten inch records. Otherwise, the operation is similar to the operation of the twelve inch records.

Means is provided to stop the operation of the motor when both sides of the entire stack of records have been played. To this end, there is fixed to the underside of wall 14, a bracket slidably carrying a sleeve 250 provided with a longitudinal slot 251. Within the sleeve is a coil compression spring 252. The cam 185 which is fixed to the sleeve 172 is adapted to contact the sleeve 250 and move said sleeve to the left during every oscillation of the cam.

Slidably mounted in sleeve 250 is a rod 254 having an upstanding pin 255 passing through the slot 251. The spring 252 is interposed between one end of the sleeve 250 and the adjacent end of rod 254. At the opposite end of the rod 254 is a hook 256. Fixed to the underside of wall 14 is another bracket 257 carrying a sleeve 258, through which the rod 254 slides. Pivoted to bracket 257 is a catch 259 adapted to engage the hook 256 and normally maintained in engagement with said hook by a coil tension spring 260.

It will be noted that the spring 252 is tensioned during each oscillation of cam 185, and that the spring is tensioned when the arm 116 is in an outwardly swung position.

Fixed to rod 254 is another rod 270 having an offset arm 271, and being slidably received in bracket 257. Rod 270 is connected to a radial arm 272 on a vertical shaft 273 controlled by the knob 220. When the knob 220 is turned in one direction to "on" position, rod 254 is moved to the right and closes the motor switch which starts the operation of the motor. At the same time, catch 259 engages the hook 256 to keep the motor in operation. The motor will stop automatically when rod 254 can move fully to the left to the dotted line position shown in Fig. 17.

Means is provided, however, for shutting off the machine at any time before all of the records on the stack are played. To this end, rod 270 is formed with a longitudinal slot 270a at one end to receive a pin 270b on arm 272, so that the motor switch knob 220 may be rotated from "on" position to "off" position without shifting the rod 270 or rod 254 to the left. Said construction is necessary because rod 254 is engaged by the catch 259 which is not released until all of the records on the stack have been played. If it is desired to shut off the machine before all the records are played, the reject knob 291 should be first turned to bring arm 116 to neutral position and swung beyond the field of the records, with the rod 177 on cam portion 163g of cam 163.

After the upper side of the last record is played, finger 87 on sleeve 86 will be at the height of the catch 259 to move the catch out of engagement with respect to the hook 256 and to release rod 254 which will then be moved to the left by the tension spring 252.

However, it is still necessary to play the underside of the last record, and means is therefore provided to prevent the rod 254 from fully moving to switch opening position until the underside of the last record is played. To this end, there is pivoted to the underside of wall 14 a latch 275 having a finger in the path of rod 254 and normally urged in a clockwise direction, as shown in Fig. 17 by a spring 276.

The latch 275, however, may be held in a position where it will stop movement of rod 254 to switch closing position by a finger 277 fixed to a vertical shaft 278 suitably journalled in the machine. At the lower end of shaft 278 is an arm 279 connected by link 280 to a bell crank 281 pivoted about a vertical axis above cam 76. On cam 76 is an upstanding pin 76b adapted to rotate the bell crank 281 in a counterclockwise direction to rotate finger 277. The bell crank 281 is maintained in contact with the pin 76b by a spring 283. Thus, stop finger 277 is oscillated by each revolution of shaft 60. Oscillation of stop finger 277 causes oscillation of latch 275. This operation, however, does not affect the rod 254 before the finger 87 disengages catch 259 from the hook 256. When finger 87 does disengage the catch 259 from hook 256, rod 254 is moved to the left until it engages the latch 275. At this time, the stop 277 is in the position shown in Fig. 17, and rod 254 is prevented from moving fully to the left to open the motor switch. The next time, pin 76b moves the bell crank 281, however, stop finger 277 will swing in a counterclockwise direction, looking at Fig. 17, to permit spring 276 to swing the latch 275 to the dotted line position shown in Fig. 17, hence permitting rod 254 to move fully to the left to open the motor switch, and stop the operation of the machine.

The pin 76b is so placed as to stop the operation of the machine after the underside of the last record has been played, and the arm 116 has swung outwardly, and the rod 177 has moved downwardly onto the neutral cam portion 163g.

Means is provided to skip the playing of either the top side of any record or the underside of any record. To this end, there is journalled within the shaft 273 an inner shaft 290 carrying a knob 291 at its upper end. Attached to the lower end of shaft 290 is an arm 292 connected to a horizontal rod 293. The rod 293 has a ratchet portion 294 at its outer end. On shaft 191 is a circular ratchet 295 engaged by ratchet portion 294 on rod 293. A spring pressed plunger 297 mounted on a bracket 298, fixed to the underside of wall 14, serves to resiliently press the ratchet portion 294 against the ratchet portion 295. At any time, when one of the needles moves onto a record to start playing the same, the lug 194 will contact the collar 202 to stop rotation of member 206, while the record is being played. If it is not desired to play the record, knob 291 is rotated to rotate ratchet 295 and turn member 206 to take the lug 194 off collar 202, so that beveled gear 193 and hence member 206 will continue rotating to rotate cam 163 and bring arm 116 to neutral position. Arm 178 at the same time will be quickly again swung outwardly without playing through the record, due to engagement of radial portion 216 with said arm. Thus, the playing of either the upper side of any record or the underside of any record may be skipped by manipulating the knob 291.

It has been shown above how the machine can operate for playing either a stack of twelve inch records or a stack of ten inch records. If it is desired to play a mixture of ten and twelve inch records, each of the ten inch records may be placed within a flat ring 300. The ring 300 has a thickness of a twelve inch record, and increases the diameter of the ten inch record to twelve inches. The ring 300 is formed on the inner edge thereof with an inwardly projecting flange 301, on which the ten inch record rests. At one point, said upper inner edge is formed with a flat projection 302, parallel to the flange 301, the edge of the ten inch record R being received between the flange 301 and the projection 302. The top surface of the ring 300 is formed with an annular needle groove 303, from which there extends a spiral groove 304, the spiral groove extending substantially 360 degrees from the groove 303 to the projection 302. The inner end of the spiral groove 304 terminates at the projection 302, as shown in Fig. 20 of the drawings. The inner end of the groove 34 communicates with the beginning of the groove 305 on the record R. Thus, when a mixture of ten and twelve inch records are played, the needle 115 comes down on the groove 303 and goes onto the groove 304 and quickly goes off the ring 300 and into the groove 305 of the record R and plays the record. The underside of the ring 300 is similar to the top side thereof, with the exception that the direction of the spiral groove 307 is reversed from the direction of the groove 304, the reason being that when the underside of the record R is played, it rotates in a direction opposite to the direction of rotation when the upper side thereof is played. Also whereas on the upper side, the needle bridges the groove from the flat ring to the ten inch record by following the groove 304 over the projection 302 to the marginal edge of the ten inch record. On the underside, similar result is accomplished by bridging the groove 307 from the flat ring to the ten inch record's marginal edge by following the groove over the flange 301 to the ten inch edge.

Ten inch records are somewhat thinner than twelve inch records, and for this reason, when all ten inch records are played, a shim or washer 310 is placed beneath each ten inch record. The shim 310 has a central opening 311, similar to the central opening in the record, and may be of several inches diameter although less than the ungrooved portion of the record. The thickness of the shim should be substantially equal to the difference between the thickness of a twelve inch record and a ten inch record.

The shims or washers 310 compensate for the difference in thickness between the ten inch records and the twelve inch records. This compensation is necessary because the shims 106 and 110 are equivalent to the thickness of twelve inch records. The washers 310 are preferably made of transparent, resilient plastic material, such as "Vinylite." The transparency of the washer permits the labels on the records to be read. The resiliency thereof absorbs shock when the turntable meets with the holder in relative motion, and said washers furthermore act as traction means to prevent slipping between the records, particularly when a relatively large number of records are used.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpeted as illustrative and not in a limiting sense.

Having thus described my invention, I claim as new and desire to secure by Letters Patent:

1. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, and means synchronized with the lifting and lowering means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer.

2. In an automatic phonograph, a turntable on which a plurality of records may be stacked, a holder above the turntable, means for lifting and lowering the turntable, means to rotate the turntable in one direction when it is in its down position, means on the holder to take off the topmost record each time the turntable is lifted, an arm carrying a downwardly pointing needle and an upwardly pointing needle, means for moving the arm into position for the downwardly pointing needle to engage the upper side of the topmost record on the stack, to play the same while the turntable is in down position, means to raise the arm after the upper side of the topmost record has been played, to take the downwardly pointing needle off said record, means to move the arm out beyond the record to permit the turntable to be lifted and then lowered, and to move said arm into position where the upwardly pointing needle engages the underside of the record taken off by the holder, for playing the underside of the record which has been taken off the stack by the holder, and for then lowering said arm to remove the upwardly pointing needle from the underside of said record carried by the holder, and means to rotate the record carried by the holder in an opposite direction, while the underside of the record carried thereby is being played.

3. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, and means synchronized with the lifting and lowering means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, said lifting and lowering means including means to stop the lowering movement of the turntable each time it is lowered at such a position that the upper surface of the topmost record on the turntable is always at a predetermined level.

4. An automatic phonograph of the character described comprising a vertical shaft, a turntable mounted thereon and for rotation therewith, said turntable being adapted to carry a stack of records, a holder mounted on said shaft and for rotation therewith, and disposed above the turntable, means for automatically repeatedly lifting the turntable and lowering the same, and means on the holder to take off the topmost record only on the turntable each time the turntable is lifted, and means synchronized with the first means to successively play one side of each record while it is on the turntable and the opposite side thereof after it is taken off the turntable by the holder, said last means including a reproducer, and means to rotate the turntable and holder in opposite directions and relative to said reproducer.

5. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, and means for alternatingly rotating said shaft in opposite directions after each lifting and lowering movement of the turntable.

6. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lifting and lowering means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, and means to control said playing means to cause the same to skip the playing of either side of any of the records on the stack.

7. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lowering and lifting means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, and means to stop the operation of the phonograph after both sides of a predetermined number of records have been played.

8. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lowering and lifting means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, means to control the playing means to cause the same to skip the playing of either side of any of the records on the stack, and means to stop the operation of the phonograph after both sides of a predetermined number of records have been played.

9. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, and means to adjust the initial position of said turntable.

10. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, and means for alternatingly rotating said shaft in opposite directions after each lifting and lowering movement of the turntable, said lifting and lowering means including means to stop the lowering movement of the turntable each time it is lowered at such a position that the upper surface of the topmost record on the turntable is always at a predetermined level.

11. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, and means to play the upper side of each topmost record on the stack and to play the underside of said record after it is taken off the stack by the holder.

12. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, means synchronized with the lifting and lowering means and said rotary means to apply a needle to the upper side of each topmost record, to play the upper side of each topmost record on the stack and apply a needle to the underside of said record to play the underside of said record after it is taken off the stack by the holder, and means to automatically stop rotation of the shaft after all of the records on the turntable are played.

13. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, means synchronized with the lifting and lowering means and said rotary means to apply a needle to the upper side of each topmost record, to play the upper side of each topmost record on the stack and apply a needle to the underside of said record to play the underside of said record after it is taken off the stack by the holder, means to automatically stop rotation of the shaft after all of the records on the turntable are played, and means to control said playing means to cause the same to skip playing of any side of any of the records of the stack.

14. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, and means for alternatingly rotating said shaft in opposite directions after each lifting and lowering movement of the turntable, an arm carrying a downwardly pointing playing needle and an upwardly pointing playing needle, means to move the arm into position for the downwardly pointing needle to engage the outer groove of the upper side of the topmost record on the turntable to play said side of said record while the turntable is in lowered position, and to then move said arm up to disengage said needle from said record after said record has been played, and then to move said arm to one side beyond said records to permit said turntable to be lifted, and to then move said arm to a position for the upwardly pointing needle to engage the underside of said record after it is taken off the turntable by the taking off means of the holder to play the underside of said record, and then to lower said arm to disengage said upwardly pointing needle from said underside of said record, and then to move said arm to one side beyond said records, and then to lower said arm and again position said arm to bring the downwardly pointing needle into the outer groove of the upper side of the then topmost record on the turntable to play said side thereof, and to repeat said movements of said arm in phase with the lifting and lowering means and with the rotating means.

15. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, an arm carrying a downwardly pointing playing needle and an upwardly pointing playing needle, means to move the arm into position for the downwardly pointing needle to engage the outer groove of the upper side of the topmost record on the turntable to play said side of said record while the turntable is in lowered position, and to then move said arm up to disengage said needle from said record after said record has been played, and then to move said arm to one side beyond said records to permit said turntable to be lifted, and to then move said arm to a position for the upwardly pointing needle to engage the underside of said record after it is taken off the turntable by the taking off means of the holder to play the underside of said record, and then to lower said arm to disengage said upwardly pointing needle from said underside of said record, and then to move said arm to one side beyond said records, and then to lower said arm and again position said arm to bring the downwardly pointing needle into the outer groove of the upper side of the then topmost record on the turntable to play said side thereof, and to repeat said movements of said arm in phase with the lifting and lowering means and with the rotating means, and means to stop the operation of said rotating means, lifting and lowering means and arm moving means when all of the records on the turntable have been played.

16. An automatic phonograph of the character described comprising a vertical shaft, a turntable mounted thereon and keyed thereto, said turntable being adapted to carry a stack of records, a holder mounted on said shaft and keyed thereto, and disposed above the turntable, means for repeatedly lifting the turntable a predetermined distance from initial position and lowering the same on said shaft, means on the holder to take off the topmost record on the turntable each time the turntable is lifted, means for alternatingly rotating said shaft in opposite directions after each lifting and lowering movement of the turntable, an arm carrying a downwardly pointing playing needle and an upwardly pointing playing needle, means to move the arm into position for the downwardly pointing needle to engage the outer groove of the upper side of the topmost record on the turntable to play said side of said record while the turntable is in lowered position, and to then move said arm up to disengage said needle from said record after said record has been played, and then to move said arm to one side beyond said records to permit said turntable to be lifted, and to then move said arm to a position for the upwardly pointing needle to engage the underside of said record after it is taken off the turntable by the taking off means of the holder to play the underside of said record, and then to lower said arm to disengage said upwardly pointing needle from said underside of said record, and then to move said arm to one side beyond said records, and then to lower said arm and again position said arm to bring the downwardly pointing needle into the outer groove of the upper side of the then topmost record on the turntable to play said side thereof, and to repeat said movements of said arm in phase with the lifting and lowering means and with the rotating means, means to stop the operation of said rotating means, lifting and lowering means and arm moving means when all of the records on the turntable have been played, and means to retain the arm from movement which will bring the needles thereon into contact with any side of any record to skip playing of any side of any of said records.

17. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lifting and lowering means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, and means to release all of the records in the holder.

18. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lifting and lowering means, to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, and means to automatically stop operation of the phonograph after a predetermined number of records have been played.

19. An automatic phonograph comprising a turntable on which a plurality of records may be stacked, a holder above the turntable, means for repeatedly lifting and lowering the turntable, means on the holder to take off the topmost record of the stack of records on the turntable each time the turntable is lifted, means synchronized with the lifting and lowering means to play the upper side of the topmost record of the stack on the turntable, and thereafter, to automatically successively play the underside of the record which was taken off the stack by the holder, and the upper side of the record then at the top of the stack after each lifting and lowering operation of the turntable, said last means including a reproducer, and means to rotate the turntable and holder in opposite directions and relative to said reproducer, means to automatically stop operation of the phonograph after a predetermined number of records have been played, and means to vary the number of records to be played before the phonograph is automatically stopped.

20. An automatic phonograph comprising a turntable adapted to carry a stack of records, a holder spaced from said turntable, means for causing relative movement between the turntable and holder toward and away from each other, means on the holder to take off one of the records on the stack each time the turntable and holder approach each other, and means synchronized with said first means, to successively automatically play opposite sides of said records, said last means including a reproducer, and means to rotate the turntable and holder in opposite directions and relative to said reproducer.

21. In an automatic phonograph, a pair of spaced, rotary record carrying means each adapted to carry a plurality of records, means for rotating one of said pair of means in one direction, and the other of said pair of means in an opposite direction, means for causing relative movement between said pair of means toward and away from each other, means on one of said pair of means to take a record off the other of said pair of means each time said pair of means approach each other, and means synchronized with the means for moving said pair of means toward and away from each other to successively automatically play opposite sides of the records carried by said pair of means, said last means including a reproducer and means to alternately move the same into engagement with said records on said pair of means and hold the same in engagement with both of said pair of means as said means rotate.

22. An automatic phonograph comprising in combination a turntable member, a holder member in opposed relation to said turntable member, means to rotate said turntable member and holder member in opposite directions, means to cause relative movement between said turntable member and holder member toward and away from each other, means to cause a record to be transferred from one of said members to the other, each time said members approach each other, and means synchronized with said first means for playing the exposed sides of the records on the turntable member and the opposite sides of the records on the holder member, said last means including a reproducer, and means to rotate the turntable and holder in opposite directions and relative to said reproducer.

23. In combination, a turntable, a holder above said turntable, means to move the turntable toward the holder, means on the holder to take a record off the turntable each time the turntable moves toward the holder, and means on the holder to simultaneously release all of the records in the holder, and means synchronized with the first means to play one side of each record while it is on the turntable and the opposite side thereof after it is taken off by the holder, said last means including a reproducer, and means to rotate the turntable and holder in opposite directions and relative to said reproducer.

BENJAMIN F. WISSNER.